(No Model.)

C. W. EAMES.
MACHINE FOR UPSETTING TIRES.

No. 250,510.  Patented Dec. 6, 1881.

Witnesses
Frank A. Brooks
Geo. H. Strong

Inventor
Charles W. Eames
By Dewey & Co. Attys

UNITED STATES PATENT OFFICE.

CHARLES W. EAMES, OF SHASTA, CALIFORNIA, ASSIGNOR OF TWO-THIRDS TO AARON BELL AND E. F. CROCKER, OF SAME PLACE.

MACHINE FOR UPSETTING TIRES.

SPECIFICATION forming part of Letters Patent No. 250,510, dated December 6, 1881.

Application filed July 5, 1881. (No model.)

*To all whom it may concern:*

Be it known that I, CHARLES W. EAMES, of Shasta, Shasta county, State of California, have invented an Improved Tire-Upsetter; and I hereby declare the following to be a full, clear, and exact description thereof.

My invention relates to a new and useful tire-upsetter; and it consists in the arrangement of a stationary arm and a movable arm and bed-piece, the former having pivoted thereto a clamping-jaw, and the latter having a similar jaw pivoted to and moving with it, said jaws having corrugated cam-heads, and being so pivoted that when forced together their clamping power is in proportion to the force exerted. The operating device is a lever which draws back and forces the movable arm toward the other. All of this will more fully appear.

Figure 1:
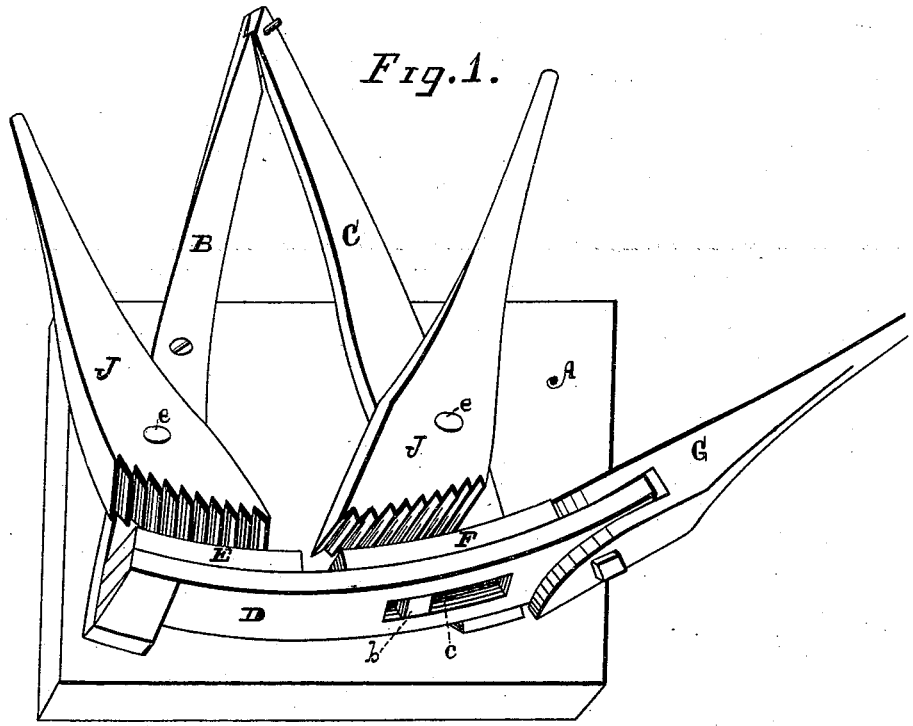
Figure 2:
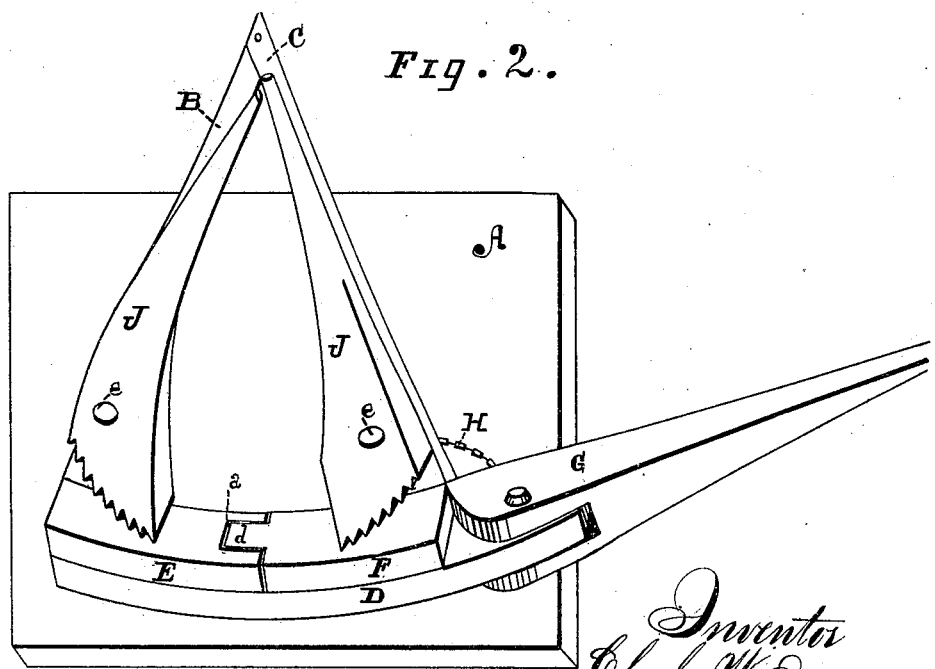

Referring to the accompanying drawings, Figure 1 shows the device open. Fig. 2 shows it closed.

Let A represent a heavy piece of timber forming the base-block of the device. To this block is bolted the arm B. To the upper end of arm B is hinged or pivoted the arm C. Joining the other ends of said arms is a curved guide or support, D. Upon one side of this guide is a bed-piece, E, having in its end a socket, *a*. Upon the other end is another bed-piece, F, attached to the movable arm C and adapted to slide upon the guide D. It is guided therein by a stud, *b*, passing through a slot, *c*, in the guide D. The end of the sliding bed-piece F has a tongue, *d*, which fits within the socket *a* of the stationary piece E.

Pivoted to the end of the guide D is the lever G, having a cam-head. This lever is attached to the movable arm C by means of a chain, H. By moving the lever in one direction it draws the arm C away from arm B. When moved in the opposite direction its cam-head pushes the arm C toward the arm B.

Pivoted to the arms B and C, at points marked *e*, are the clamping jaws or dogs J J, having cam-heads provided with corrugations or teeth, as shown.

The operation of the device is as follows: The lever G is drawn up and the movable arm C drawn away, so that the bed-piece F slides away from the bed-piece E. The tire is then laid in between the jaws J J and the bed-pieces E and F, and the jaws are clamped down upon it by pushing their upper ends together and forcing the points of their heads against the tire. The lever is then operated. Its cam-head forces the movable piece F and arm C toward the stationary parts, the jaw J being carried with them. This jaw, in being forced forward, tightly clamps the tire, while the other jaw clamps the tire as tightly in consequence of the tendency of the tire to move under and beyond it, but which is prevented by the serrations of the jaws. This arrangement of cam-shaped operating parts is simple and effective. All the parts are to be made of wrought-iron, except the pivot-shafts, which are to be made of steel. The faces of the clamping-jaws are also made of steel.

The advantage of this device lies in its simplicity and effectiveness. Great force can be exerted to press the lever down, and in proportion to that force the clamping-power of the jaws is increased.

Having thus described my invention, what I claim as new, and desire to secure by Letters Patent, is—

The tire-upsetter consisting of the stationary arm B, guide D, and bed-piece E, the swinging or movable arm C and sliding bed-piece F, the clamping jaws or dogs J J, with their corrugated cam-heads, and pivoted to the arms, as shown, and the operating-lever G, with its cam-head, and the connecting-chain H, when arranged substantially as and for the purpose herein described.

In witness whereof I have hereunto set my hand.

CHARLES W. EAMES.

Witnesses:
F. C. TIFFIN,
N. H. STEPHENS.